United States Patent
Masui et al.

(10) Patent No.: US 6,226,135 B1
(45) Date of Patent: May 1, 2001

(54) REFLECTOR TYPE PRISM AND REFLECTOR TYPE PRISM FORMING DIE

(75) Inventors: Mayumi Masui; Mitsuru Hagimoto, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/179,820

(22) Filed: Oct. 28, 1998

(30) Foreign Application Priority Data

Oct. 28, 1997 (JP) .................................................... 9-312678

(51) Int. Cl.$^7$ .............................. G02B 5/04; B29D 11/00
(52) U.S. Cl. .......................... 359/831; 359/834; 359/836; 264/1.1; 264/1.9; 264/2.2; 425/470; 425/808
(58) Field of Search ..................................... 359/834, 835, 359/836, 833, 831, 896; 264/1.1, 1.24, 1.29, 1.32, 1.34, 1.7, 1.9, 2.2, 2.3, 2.5, 2.7; 425/808, 403, 470

(56) References Cited

U.S. PATENT DOCUMENTS

| | | |
|---|---|---|
| 1,758,977 | 5/1930 | Rolph . |
| 2,206,797 * | 7/1940 | Williams . |
| 2,394,941 * | 2/1946 | Smith . |
| 3,248,460 * | 4/1966 | Naujokas . |
| 3,278,285 * | 10/1966 | Pickering . |
| 3,396,214 * | 8/1968 | Crandon . |
| 3,422,168 * | 1/1969 | Bowser . |
| 3,423,488 * | 1/1969 | Bowser . |
| 4,211,384 * | 7/1980 | Bourset et al. . |
| 4,347,198 * | 8/1982 | Ohkada et al. . |
| 4,747,667 * | 5/1988 | Tanaka et al. . |
| 4,935,621 * | 6/1990 | Pikulski . |
| 5,002,379 * | 3/1991 | Murtha . |
| 5,035,486 * | 7/1991 | Inokuchi . |
| 5,175,780 * | 12/1992 | Sano et al. . |
| 5,225,942 * | 7/1993 | Ikeno et al. ........................... 359/836 |
| 5,545,366 * | 8/1996 | Lust et al. . |
| 5,767,508 * | 6/1998 | Masui et al. . |
| 5,780,140 * | 7/1998 | Nilsen ................................... 264/1.1 |
| 5,838,504 * | 11/1998 | Ichikawa et al. ..................... 359/834 |
| 5,973,864 * | 10/1999 | Lehmann et al. ..................... 359/834 |

FOREIGN PATENT DOCUMENTS

| | | |
|---|---|---|
| 461835 | 10/1968 | (CH) . |
| 3004412 * | 8/1981 | (DE) . |
| 4113795 | 12/1992 | (DE) . |
| 196 16 384 | 10/1996 | (DE) . |
| 2512551 * | 3/1983 | (FR) . |
| 301672 | 12/1928 | (GB) . |
| 56-152249 | 11/1981 | (JP) . |
| 59-007903 | 1/1984 | (JP) . |
| 59-078305 | 5/1984 | (JP) . |
| 59-102202 | 6/1984 | (JP) . |
| 62-091902 | 4/1987 | (JP) . |
| 62-171268 | 7/1987 | (JP) . |

* cited by examiner

*Primary Examiner*—Ricky D. Shafer
(74) *Attorney, Agent, or Firm*—Wenderoth, Lind & Ponack, L.L.P.

(57) ABSTRACT

The bottom surfaces of an entering surface-forming portion 1*a* for forming a light-entering surface 11*a* of a reflector type prism 11 and of an emitting surface-forming portion 1*b* for forming a light-emitting surface 11*b* of the reflector type prism 11 are formed as concave surfaces in a die 1. Even if shrinkage of the reflector type prism 11 occurs during its formation, the light-entering surface 11*a* and the light-emitting surface 11*b* are, at least, not formed as concave surfaces, so that a light beam entering the reflector type prism 11 and a light beam emitted from the reflector type prism 11 are prevented from becoming scattered.

4 Claims, 7 Drawing Sheets

REFLECTOR TYPE PRISM AND REFLECTOR TYPE PRISM FORMING DIE

BACKGROUND OF THE INVENTION

The present invention relates to a reflector type prism having the function of reflecting an incoming beam in a direction that is the reverse of the incoming direction, and a reflector type prism forming die.

In the prior art, a light sensor 109 constituted of a light-emitting element 105 and a light-receiving element 107 and a reflector type prism 111 are employed to detect the number, the traveling speed and the like of bodies to be detected 103, such as sheets of paper that are traveling on a conveyor 101, as illustrated in FIG. 8. The light sensor 109 and the reflector type prism 111 are positioned at opposing sides of the conveyor 101, and face each other.

As illustrated in FIG. 9, the reflector type prism 111 has the function of reflecting a light beam A emitted by the light-emitting element 105 in a direction that is the reverse of its incoming direction to cause the light to strike the light-receiving element 107 as a light beam B. Consequently, the bodies to be detected 103 block the light beam A and the light beam B as they travel on the conveyor 101. The blocking of the light beams A and B by a body to be detected 103 is detected by the light-receiving element 107, so that the light sensor 109 can make decisions as to the presence/absence of a body to be detected 103, its state and the like, based upon this information.

Since a high degree of accuracy is required in setting the optical axes of the light beams A and B, it is crucial that the positioning process for mounting the light sensor 109 and the reflector type prism 111 at specific mounting members be implemented with a high degree of precision. Thus, both a light-emitting surface 109a and a light-entering surface 109b of the light sensor 109 are formed as projecting portions so that the light sensor 109 can be mounted with ease and accuracy to one of the guides of the conveyor 101, i.e., a guide 101a. Likewise, both a light-entering surface 111a and a light-emitting surface 111b of the reflector type prism 111 are formed as projecting portions so that the reflector type prism 111 can be mounted with ease and accuracy to another guide 101b of the conveyor 101. It is to be noted that the reflector type prism 111 formed in the shape described above and having the function described above is constituted of a raw material such as an acrylic resin, a polycarbonate resin or the like and, as illustrated in FIG. 10, it is formed using a die 113.

However, since the reflector type prism 111 shrinks to a certain degree during its formation using the die 113, there is a concern that the light-entering surface 111a and the light-emitting surface 111b may be formed as concave surfaces relative to the direction of the light beams A and B, as illustrated in FIG. 11. If the light-entering surface 111a and the light-emitting surface 111b form concave surfaces in this manner, the light beams A and B become scattered, and ultimately, the quantity of light in the light beam B reaching the light-receiving element 107 of the light sensor 109 becomes reduced. In particular, if the quantity of light in the light beam B is less than a specific value when the distance between the light sensor 109 and the reflector type prism 111 is great or when a high S/N ratio is required, the light-receiving element 107 may erroneously detect a body to be detected 103, causing erroneous operation in various types of processing performed based upon a detection signal (not shown)output by the light sensor 109.

In addition, the reflector type prism 111 is mounted at the conveyor 101 by inserting the projecting portion upon which the light-entering surface 111a is formed and the projecting portion upon which the light-emitting surface 111b is formed into through holes h1 and h2, respectively, that are provided in the guide 101b for positioning, and then by securing the reflector type prism 111 with a separate mounting blade spring or the like (not shown). Thus, the structure through which the reflector type prism 111 is mounted to the guide 101a in the prior art is complicated, causing an increase in production cost and an increase in the number of work steps.

Furthermore, since the reflector type prism 111 in the prior art is colorless and transparent, a so-called random external light C unrelated to the light beam A may enter the reflector type prism 111 through a portion other than the light-entering surface 111a, as illustrated in FIG. 8, to reach the light-receiving element 107. This presents a problem in that it may cause the light-receiving element 107 to operate erroneously, making accurate detection of the body to be detected by the light sensor 109 impossible.

SUMMARY OF THE INVENTION

A first object of the present invention, which has been completed by addressing the problems of the reflector type prism in the prior art described above, is to provide a new and improved reflector type prism with which a light beam emitted from the light-emitting surface of the reflector type prism is prevented from becoming scattered, to achieve stable detection of the light beam emitted from the reflector type prism by a light-receiving element, and to provide a reflector type prism forming die.

A second object of the present invention is to provide a new and improved reflector type prism that may be secured to a specific mounting member without having to provide a complicated mounting mechanism.

A third object of the present invention is to provide a new and improved reflector type prism that is capable of stably emitting a light beam that has entered it without being affected by a random external light.

In order to achieve the objects described above, in a first aspect of the present invention, a reflector type prism forming die for forming a reflector type prism which has the function of reflecting an incoming light beam in a direction that is the reverse of its incoming direction, is provided. This reflector type prism forming die is characterized in that either or both of a forming surface for forming a light-emitting surface of a reflector type prism and, a forming surface for forming a light-entering surface of the reflector type prism is formed as a concave surface.

This die makes it possible to form either or both of the light-emitting surface or the light-entering surface of the reflector type prism as a convex surface. In other words, even if shrinkage occurs during the formation of the reflector type prism, the light-emitting surface and/or the light-entering surface will not be formed as a concave surface so that an emitted light beam can be prevented from becoming scattered or attenuated. Consequently, with the reflector type prism formed by using the reflector type prism forming die according to the present invention, an emitted light, which may be received by, for instance, a light-receiving element, can be detected in a stable manner.

In addition, the reflector type prism may be constituted to have the function of reflecting an incoming light beam in a direction that is the reverse of its incoming direction. In this case, either or both of the prism's light-emitting surface and light-entering surface is formed as a convex surface.

Such a prism makes it possible to inhibit scattering and attenuation of a light beam that enters the reflector type prism and is emitted therefrom after being reflected. Consequently, a light emitted from the reflector type prism, which may be received by, a light-receiving element can be detected in a stable manner.

In addition, by forming the convex surface in the reflector type prism described above as a spherical surface, the scattering of a light beam emitted from the reflector type prism can be even more effectively prevented. By forming the convex surface as a nonspherical surface, spherical aberration of the emitted light beam can be avoided and, it becomes possible to adjust the focal length of the emitted light beam. Thus, with the reflector type prism according to the present invention, an emitted light can be detected in a stable manner by a light-receiving element.

Either or both of the light-emitting surface and the light-entering surface may be formed an the projecting portion provided to secure the reflector type prism at a specific position of a specific mounting member.

Thus, it becomes possible to determine the positions of the light-emitting surface and the light-entering surface of the reflector type prism at the same time when the prism is secured at this specific position. As a result, adjustment of the optical axes of a light beam entering the reflector type prism and a light beam emitted from the reflector type prism is facilitated, respectively.

According a second aspect of the present invention, an alternative reflector type prism is provided. This reflector type prism includes a first light-entering surface group constituted a plurality of light-entering surfaces provided in successive stages relative to the travel direction of the incoming light beam, a first reflecting surface reflects that incoming light beam entering from the first light-entering surface group in a specific direction through a first light-emitting surface group constituted of a plurality of light-emitting surfaces provided in successive stages relative to the travel direction of the reflected light beam, a second light-entering surface group constituted of a plurality of light-entering surfaces provided in successive stages relative to the travel direction of the light beam receives the light beam emitted from the first light-emitting surface group, a second reflecting surface reflects the incoming light beam entering from the second light-entering surface group in a specific direction through a second light-emitting surface group constituted of a plurality of light-emitting surfaces provided in successive stages relative to the direction of the light beam that has been reflected by the second reflecting surface.

This reflector type prism makes it possible to reduce the thickness of the prism while assuring sufficient area for the light-entering surface and for the light-emitting surface, thereby reducing the shrinkage of the reflector type prism which occurs during formation. As a result, a reflector type prism that demonstrates good optical performance is realized. In particular, the advantages of the present invention will be demonstrated more effectively when it is adopted in larger reflector type prisms that tend to shrink to a greater degree during their formation.

In a third aspect of the present invention, a reflector type prism having the function of reflecting an incoming light beam in a direction that is the reverse of its incoming direction, which is characterized in that a plurality of mounting hooks are provided at the side of the prism where the light-emitting surface and the light-entering surface are formed, is provided.

These mounting hooks make it possible to secure the reflector type prism at a specific position with ease simply by providing holes for connecting the hooks to a specific member for mounting the reflector type prism.

In a fourth aspect of the present invention, the reflector type prism having the function of reflecting an incoming light beam in a direction that is the reverse of its incoming direction, which is characterized in that a visible-light blocking agent that can block visible light is mixed, with the prism, is provided.

A reflector type prism including such a blocking agent allows an incoming light beam to be reflected and emitted in a stable manner without being affected by a random external light in the visible light range when, for instance, the incoming light beam is in the infrared range. Consequently, an improvement in detection accuracy including an improvement in the S/N ratio can be achieved when an emitted light from a light-emitting element is reflected by the reflector type prism to detect the reflected light with the light-receiving element.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENTS

The following is a detailed explanation of the preferred embodiments of the reflector type prism and the reflector type prism forming die according to the present invention in reference to the attached drawings. It is to be noted that the same reference numbers are assigned to components having almost identical functions and structural features in the following explanation and the attached drawings to preclude the necessity for repeated explanation thereof.

First Embodiment

Figure 1:
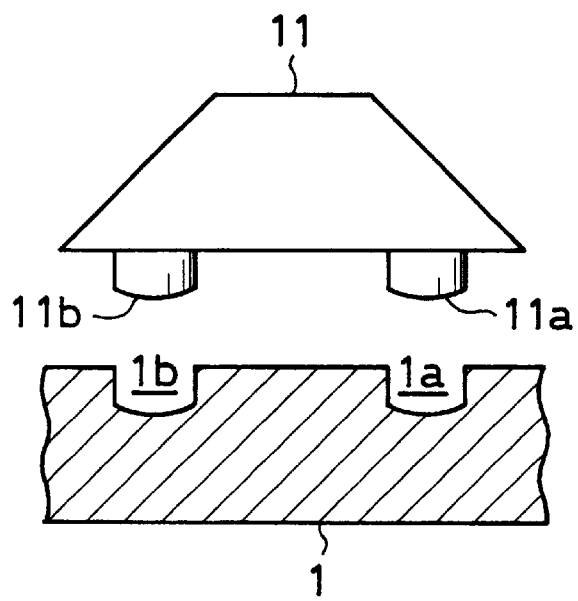
FIG. 1 illustrates the reflector type prism and its die in a first embodiment of the present invention.
Figure 2:
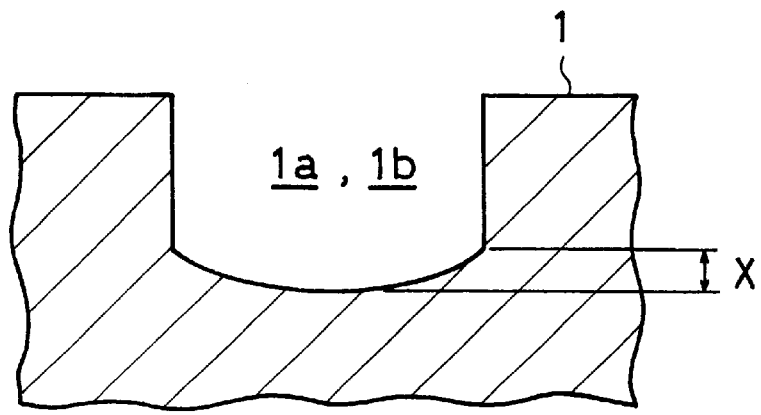
FIG. 2 is an enlarged cross section of the entering surface-forming portion and the emitting surface-forming portion in the die shown in FIG. 1.
Figure 8:
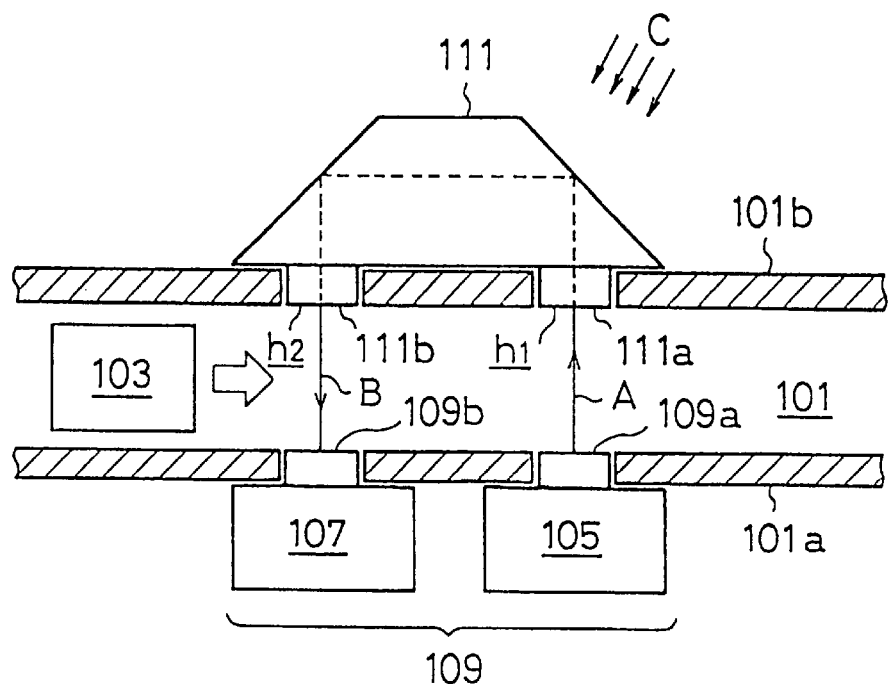
FIG. 8 illustrates a reflector type prism in the prior art mounted at a conveyor.
Figure 9:
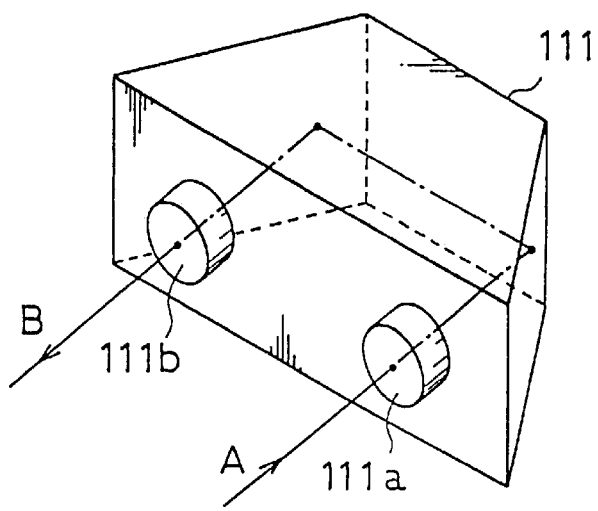
FIG. 9 is a perspective of a reflector type prism in the prior art.
Figure 10:
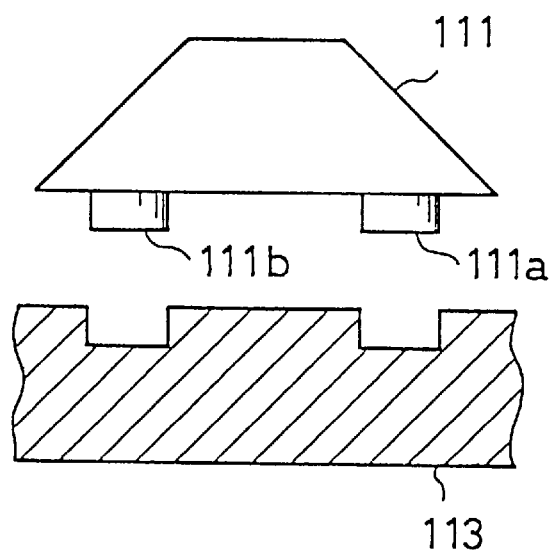
FIG. 10 illustrates a reflector type prism and its die in the prior art.
Figure 11:
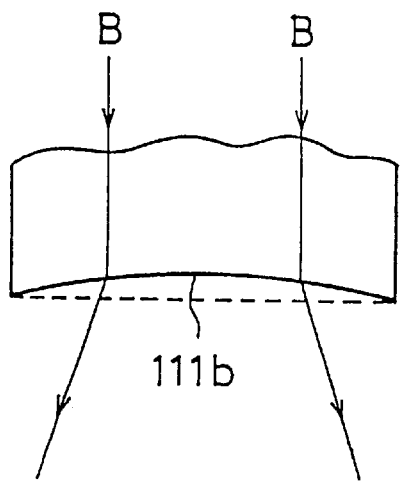
FIG. 11 is an enlargement of the light-emitting surface of a reflector type prism in the prior art.

FIG. 1 shows a die 1 which is employed as the reflector type prism forming die in the first embodiment and a reflector type prism 11. It is to be noted that by employing the die 1, the reflector type prism 11 can be formed. In addition, the reflector type prism 11 functions so that a light beam A, which enters through a light-entering surface 11a, is emitted as alight beam B through a light-emitting surface 11b in a direction that is opposite the direction of light beam A, as in the reflector type prism 111 in the prior art illustrated in FIGS. 8 and 9. As illustrated in FIG. 2, the bottom surfaces of an entering surface-forming portion 1a for forming the light-entering surface 11a of the reflector type prism 11 and of an emitting surface-forming portion 1b for forming the light-emitting surface 11b of the reflector type prism 11 are formed as concave surfaces. With the distance x from an edge of the concave surface to the deepest portion of each of these bottom surfaces set at, for instance, 10 μm, the light-entering surface 11a and the light-emitting surface 11b are at least not formed as concave surfaces, even if shrinkage occurs in the reflector type prism 11 during its formation, i.e. this is the minimal concavity to ensure the formation of non-concave light-entering and non-concave light-emitting surfaces so that the light beam A entering the reflector type prism 11 and the light beam B emitted from the reflector type prism are prevented from becoming scattered.

Figure 3:
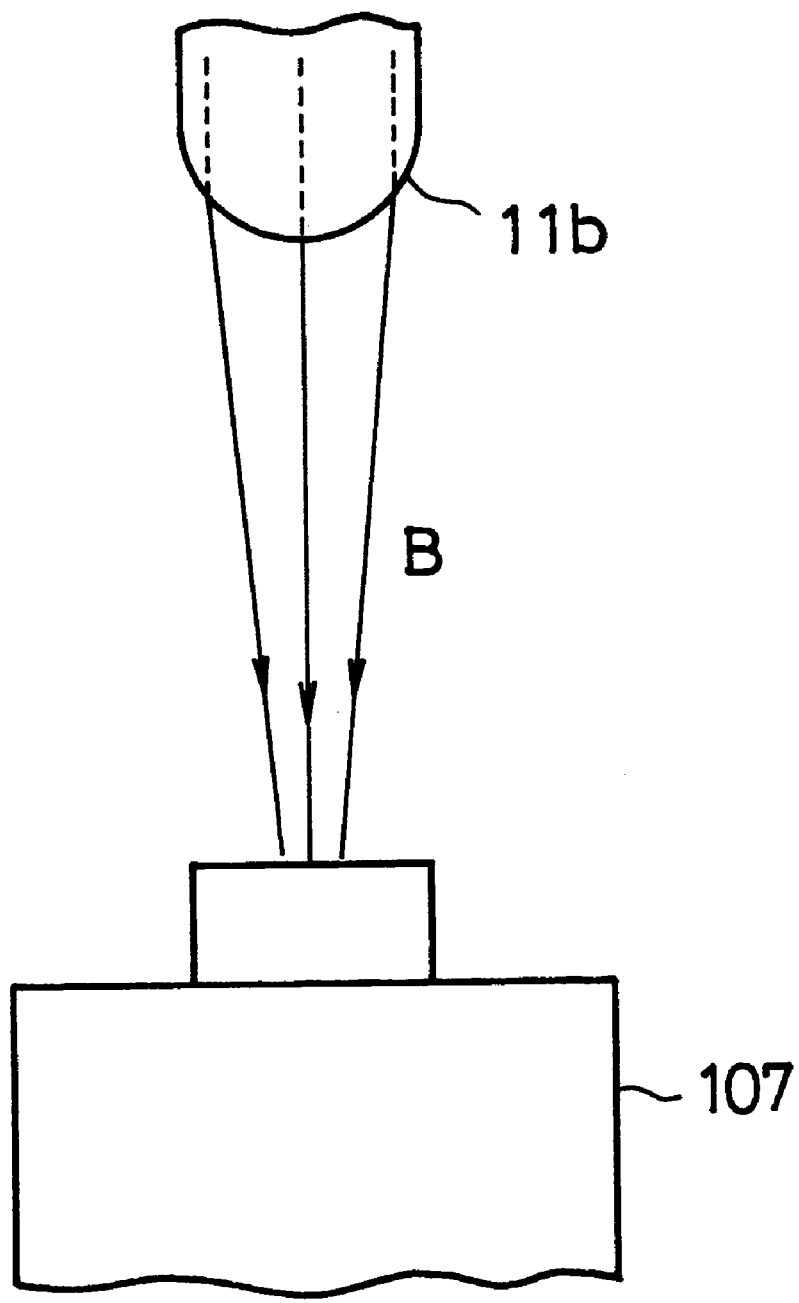
FIG. 3 illustrates the light-emitting surface of the reflector type prism in FIG. 1 and the light-receiving element that receives the light beam B emitted from the light-emitting surface.

Furthermore, the light-entering surface 11a and the light-emitting surface 11b of the reflector type prism 11 may be formed as spherical surfaces or nonspherical surfaces, including paraboloidal surfaces. In either case, it is possible to more effectively prevent the light beam A entering the reflector type prism 11 and the light beam B emitted from the reflector type prism 11 from becoming scattered. In particular, by forming the light-emitting surface 11b as a spherical surface or a nonspherical surface, as illustrated in FIG. 3, it becomes possible to constrain the light beam B in correspondence to the distance between the reflector type prism 11 and the light-receiving element 107 to stabilize the light-receiving state for the light beam B at the light-receiving element 107, ultimately resulting in an improvement in the S/N ratio. It is extremely effective to form the emitting portion 11b as a nonspherical surface when the distance between the reflector type prism 11 and the light-receiving element 107 is great, since a spherical aberration of the light beam B can be prevented.

In addition, as illustrated in FIGS. 1 and 3, the light-entering surface 11a and the light-emitting surface 11b of the reflector type prism 11 are each formed at a projecting portion. This makes it possible to determine the securing position for the reflector type prism 11 simply by providing positioning holes that correspond to the projecting portions in a specific mounting member (not shown) to which the reflector type prism 11 is to be mounted, to facilitate the positioning process.

Second Embodiment

Figure 4:
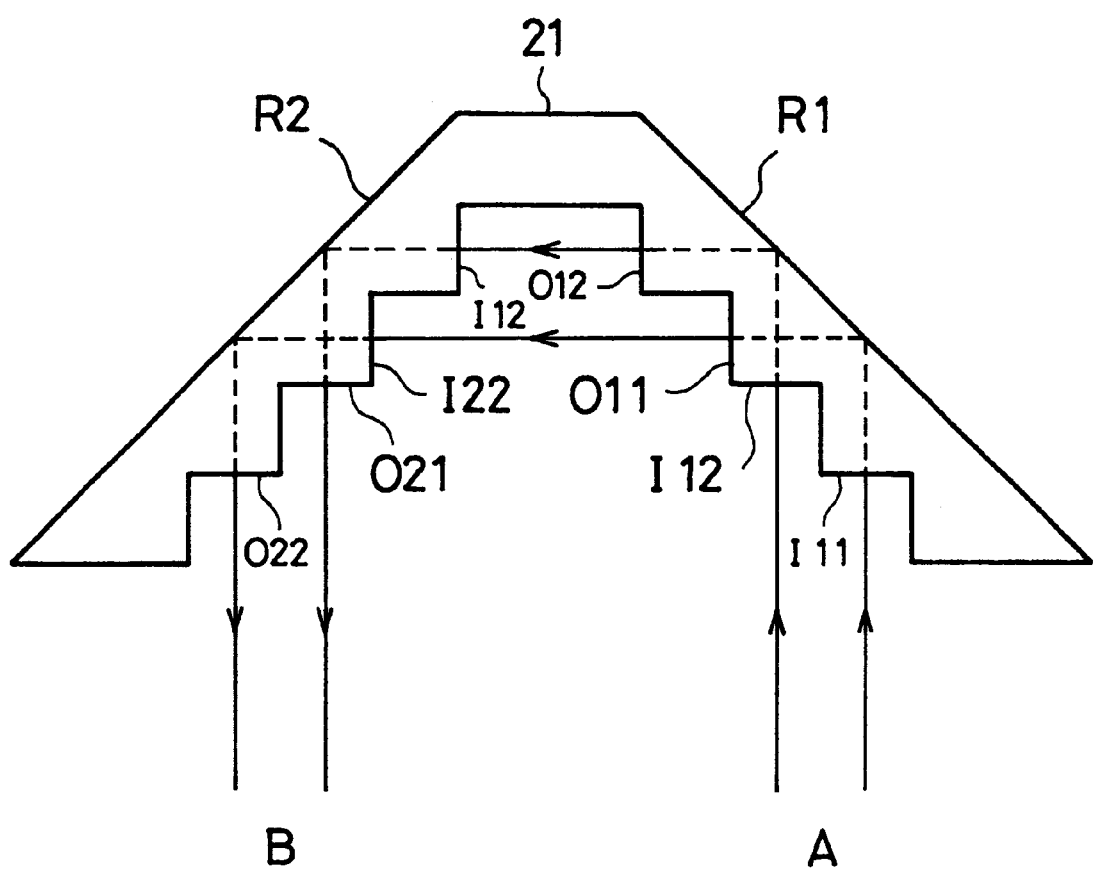
FIG. 4 illustrates the reflector type prism in a second embodiment the present invention.

FIG. 4 shows a reflector type prism 21 in the second embodiment. This reflector type prism 21 is provided with light-entering surfaces I11, I12, I21 and I22, light-emitting surfaces 011, 012, 021 and 022, a first reflecting surface R1 and a second reflecting surface R2.

The light-entering surfaces I11 and I12 are structured in successive stages relative to the direction of a light beam A, and the first reflecting surface R1 is constituted so that the light beam A entering from the light-entering surfaces I11 and I12 is reflected at a right angle. In addition, the light-emitting surfaces 011 and 012 are structured in successive stages relative to the direction of the light beam reflected by the first reflecting surface R1. The light-entering surfaces I21 and I22 are structured in successive stages relative to the direction of the light beam that has been emitted from the light-emitting surfaces 011 and 012 respectively, and the second reflecting surface R2 is constituted so that the light beam entering from the light-entering surfaces I21 and I22 is reflected at a right angle. In addition, the light-emitting surfaces 021 and 022 are structured in successive stages relative to the direction of the light beam that has been reflected by the second reflecting surface R2. In other words, the light beam A entering through the light-entering surfaces I11 and I12 is turned back as the light beam B via the first reflecting surface R1, the light-emitting surfaces 011 and 012, the light-entering surfaces I21 and I22, the second reflecting surface R2 and the light-emitting surfaces 021 and 022.

By adopting this reflector type prism, a low profile reflector type prism 21 is achieved while maintaining the function of reflecting the light beam A in a direction that is the reverse of its incoming direction, as in the reflector type prism 111 in the prior art. As a result, it is possible to minimize shrinkage during formation of the reflector type prism 21 when employing a die or the like, to achieve optically good performance which approximates the performance design values.

Third Embodiment

Figure 5:
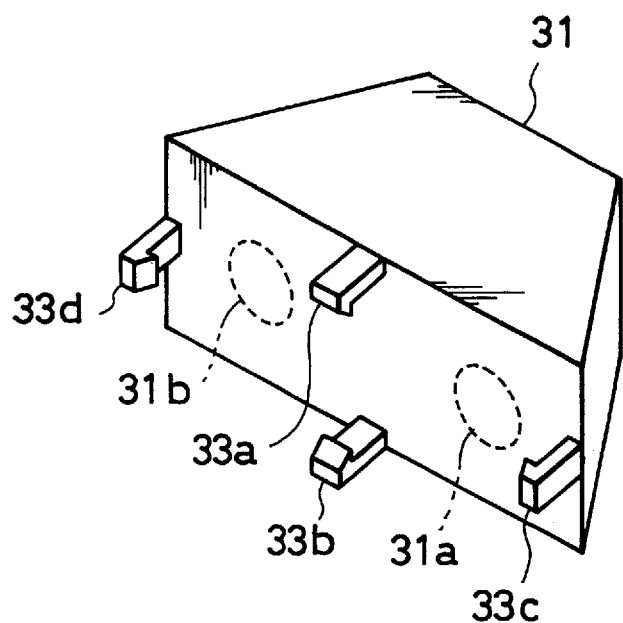
FIG. 5 is a perspective of the reflector type prism in a third embodiment of the present invention.

FIG. 5 shows a reflector type prism 31 in the third embodiment. This reflector type prism 31 is provided with four hooks 33a, 33b, 33c and 33d at the surface where a light-entering surface 31a and a light-emitting surface 31b are formed.

Figure 6:
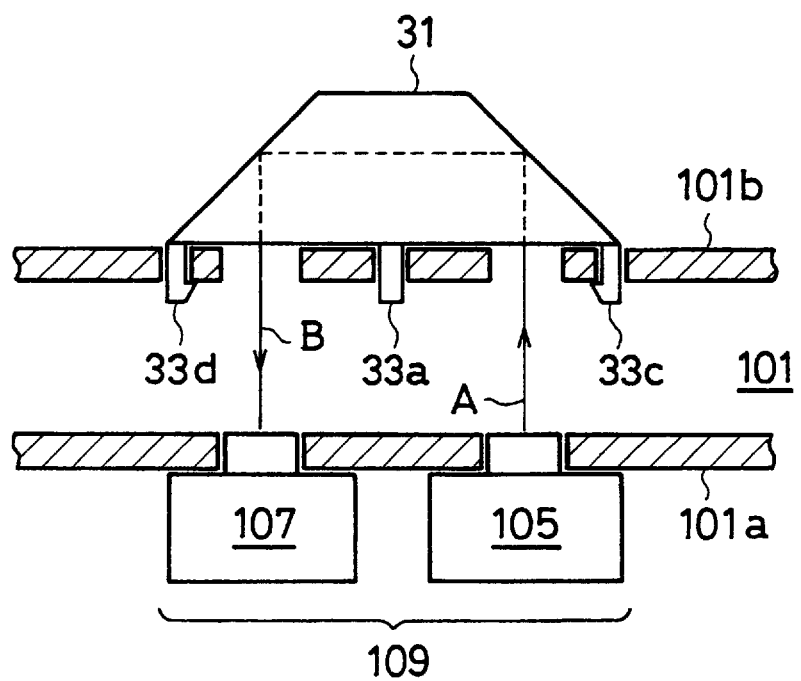
FIG. 6 illustrates the reflector type prism in FIG. 5 mounted at a conveyor.

As illustrated in FIG. 6, by forming mounting holes for mounting the four hooks 33a, 33b, 33c and 33d, a hole for allowing the light beam A from a light-emitting element 105 of a light sensor 109 to enter the light-entering surface 31a and a hole for allowing the light beam B to be emitted through the light-emitting surface 31b to enter a light-receiving element 107, in a guide 101b of the conveyor 101, the reflector type prism 31 is positioned with a high degree of accuracy. In other words, the reflector type prism 31 can be positioned for mounting without having to form projecting portions having a light-entering surface or a light-emitting surface, as in the case of the reflector type prism 111 in the prior art. In addition, the reflector type prism 31 can be secured to the guide 101b without having to employ a separate mounting blade spring or the like. Thus, the process for mounting the reflector type prism 31 is greatly facilitated compared to that for the reflector type prism 111 in the prior art.

It is to be noted that while an explanation is given on the reflector type prism 31 having four hooks 33a, 33b, 33c and 33d in reference to the third embodiment, the number of hooks is not restricted to four in the present invention and two hooks, for instance, may be provided or, for the purpose of improving the securing force, the number of hooks maybe increased.

Furthermore, while the light-entering surface 31a and the light-emitting surface 31b of the reflector type prism 31 in the third embodiment are formed on a single flat surface, the present invention maybe adopted in a structure in which the light-entering surface 31a and the light-emitting surface 31b are formed at projecting portions, as in the reflector type prism 111 in the prior art.

Fourth Embodiment

Figure 7:
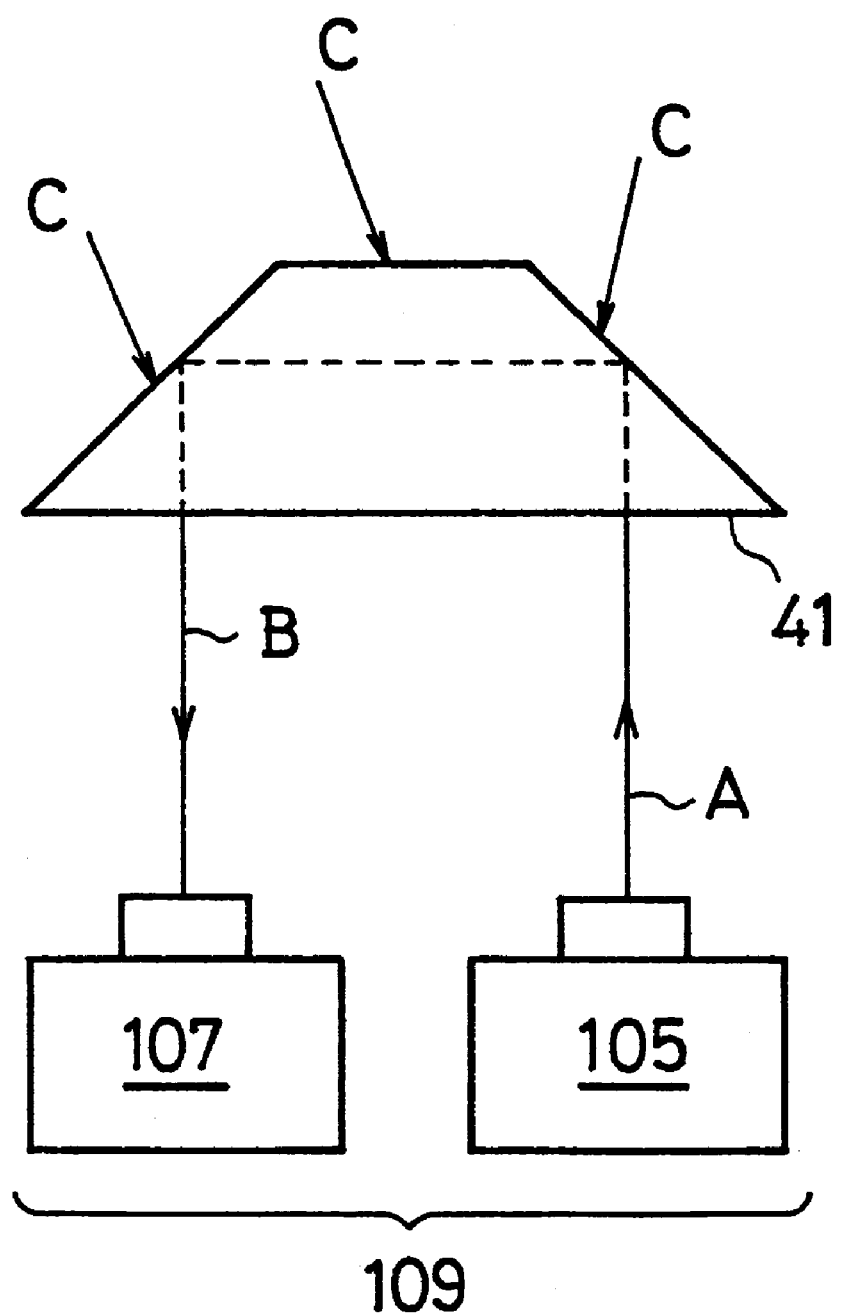
FIG. 7 illustrates the reflector type prism in a fourth embodiment of the present invention.

A reflector type prism 41 in the fourth embodiment is characterized in that a visible-light blocking agent is mixed with the prism when it is formed by using a die (not shown). As illustrated in FIG. 7, this ensures that even if a random external light C in the visible light range is radiated onto the reflector type prism 41 when the light beam A in the infrared light range is emitted from a light-emitting element 105 of alight sensor 109, the random external light C is not allowed to permeate the reflector type prism 41. In other words, the reflector type prism 41 functions so that the light beam A from the light-emitting element 105 is selectively allowed to enter, be reflected and be emitted as the light beam B. Consequently, the S/N ratio is improved at the light-receiving element 107 to achieve an improvement in the detection accuracy of the object to be detected.

While the explanation is given on the reflector type prism 41 constituted by mixing a visible-light blocking agent with the prism, in reference to this embodiment, the reflector type prism maybe constituted of colored glass, for instance, that allows only light having the wavelength of the light beam A to pass through.

As has been explained, by adopting the reflector type prism forming die and an the reflector type prism according to the present invention, it becomes possible to emit a light beam that has entered the reflector type prism without allowing it to become scattered.

Also, by forming a light-emitting surface or a light-entering surface of the reflector type prism as a spherical surface or a nonspherical surface, it becomes possible to adjust the focal length of the emitted light beam in correspondence to, for instance, the distance between the light-receiving element and the reflector type prism.

In addition, with the reflector type prism having a plurality of mounting hooks at the side where the light-emitting surface and the light-entering surface are formed, its positioning for mounting it to a specific mounting member and its securing thereto are facilitated.

Furthermore, by mixing a visible-light blocking agent, that is capable of blocking out visible light, with the reflector type prism, it becomes possible to reflect and emit a light beam that has entered in a stable manner without being affected by random external light.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The entire disclosure of Japanese Patent Application No. 9-312678 filed on Oct. 28, 1997 including specification, claims, drawings and summary is incorporated herein by reference in its entirety.

What is claimed is:

1. A die for forming a reflector type prism for reflecting an incoming light beam in a direction that is opposite to an incoming direction of the light beam, wherein the reflector type prism has a light-emitting surface, the die comprising:
   a concave forming surface for forming the light-emitting surface, wherein said concave forming surface is defined by
   (i) an edge defining a plane, and
   (ii) a concave portion extending from the edge to a bottom-most point thereof, wherein a distance from the plane to the bottom-most point is 10 $\mu$m such that during formation of the reflector type prism the light-emitting surface remains non-concave even after shrinkage thereof.

2. A die for forming a reflector type prism for reflecting an incoming light beam in a direction that is opposite to an incoming direction of the light beam, wherein the reflector type prism has a light-emitting surface, the die comprising:
   a concave forming surface for forming the light-emitting surface, wherein the concave forming surface is defined by
   (i) an edge defining a plane, and
   (ii) a concave portion extending from the edge to a bottom-most point thereof, wherein a distance of 10 $\mu$m from the plane to the bottom-most point defines the minimal concavity that will result in the light-emitting surface remaining non-concave during its formation even after shrinkage thereof.

3. A die for forming a reflector type prism for reflecting an incoming light beam in a direction that is opposite to an incoming direction of the light beam, wherein the reflector type prism has a light-entering surface, the die comprising:
   a concave forming surface for forming the light-entering surface, wherein said concave forming surface is defined by
   (i) an edge defining a plane, and
   (ii) a concave portion extending from the edge to a bottom-most point thereof, wherein a distance from the plane to the bottom-most point is 10 $\mu$m such that during formation of the reflector type prism the light-entering surface remains non-concave even after shrinkage thereof.

4. A die for forming a reflector type prism for reflecting an incoming light beam in a direction that is opposite to an incoming direction of the light beam, wherein the reflector type prism has a light-entering surface, the die comprising:
   a concave forming surface for forming the light-entering surface, wherein the concave forming surface is defined by
   (i) an edge defining a plane, and
   (ii) a concave portion extending from the edge to a bottom-most point thereof, wherein a distance of 10 $\mu$m from the plane to the bottom-most point defines the minimal concavity that will result in the light-entering surface remaining non-concave during its formation even after shrinkage thereof.

* * * * *